US010419730B2

(12) United States Patent  
Terada

(10) Patent No.: US 10,419,730 B2  
(45) Date of Patent: Sep. 17, 2019

(54) IMAGE PROJECTION OPTICAL UNIT AND PROJECTOR

(71) Applicant: KONICA MINOLTA, INC., Chiyoda-ku (JP)

(72) Inventor: Masahiro Terada, Nishinomiya (JP)

(73) Assignee: KONICA MINOLTA, INC., Tokyo (JP)

( * ) Notice: Subject to any disclaimer, the term of this patent is extended or adjusted under 35 U.S.C. 154(b) by 33 days.

(21) Appl. No.: 15/318,833

(22) PCT Filed: Jun. 11, 2015

(86) PCT No.: PCT/JP2015/066893  
§ 371 (c)(1),  
(2) Date: Dec. 14, 2016

(87) PCT Pub. No.: WO2015/194454  
PCT Pub. Date: Dec. 23, 2015

(65) Prior Publication Data  
US 2017/0142378 A1    May 18, 2017

(30) Foreign Application Priority Data

Jun. 20, 2014 (JP) .................................. 2014-126909

(51) Int. Cl.  
*H04N 9/31* (2006.01)  
*G02B 5/04* (2006.01)  
(Continued)

(52) U.S. Cl.  
CPC ............. *H04N 9/3105* (2013.01); *G02B 5/04* (2013.01); *G02B 26/02* (2013.01); (Continued)

(58) Field of Classification Search  
CPC . H04N 9/31; G02B 5/04; G02B 26/02; G02B 26/08; G02B 27/14; G02B 27/18; G03B 21/00; G03B 21/20; G03B 33/06  
See application file for complete search history.

(56) References Cited

U.S. PATENT DOCUMENTS

2007/0024945 A1* 2/2007 Huang ............... G02B 27/1026  
359/237  
2007/0296924 A1* 12/2007 Ishii ........................ G03B 21/14  
353/30

FOREIGN PATENT DOCUMENTS

JP   2005-055855   3/2005  
JP   2013-125168   6/2013  
WO  WO 2008/127238  10/2008

* cited by examiner

*Primary Examiner* — Cara E Rakowski  
*Assistant Examiner* — Danell L Owens  
(74) *Attorney, Agent, or Firm* — Cozen O'Connor

(57) ABSTRACT

An image projection optical unit includes a digital micromirror device and a prism optical system. The digital micromirror device is configured to drive micromirrors, which are subjected to ON/OFF control, with respect to two axes. The prism optical system is configured to emit, to an image projection side, ON light reflected at the micromirror in an ON state among emitted light the intensity of which has been modulated by the digital micromirror device. An optical path, which is configured to emit, to the image projection side in a direction different from the ON light, OFF light reflected at the micromirror in an OFF state among the emitted light the intensity of which has been modulated by the digital micromirror device, is secured in the prism optical system.

21 Claims, 10 Drawing Sheets

(51) Int. Cl.
*G02B 26/02* (2006.01)
*G02B 26/08* (2006.01)
*G02B 27/14* (2006.01)
*G03B 21/00* (2006.01)
*G03B 21/16* (2006.01)
*G03B 33/06* (2006.01)
*G03B 21/20* (2006.01)

(52) U.S. Cl.
CPC ....... *G02B 26/0833* (2013.01); *G02B 27/149* (2013.01); *G03B 21/008* (2013.01); *G03B 21/16* (2013.01); *G03B 21/2066* (2013.01); *G03B 33/06* (2013.01)

FIG. 10A
FIG. 10B
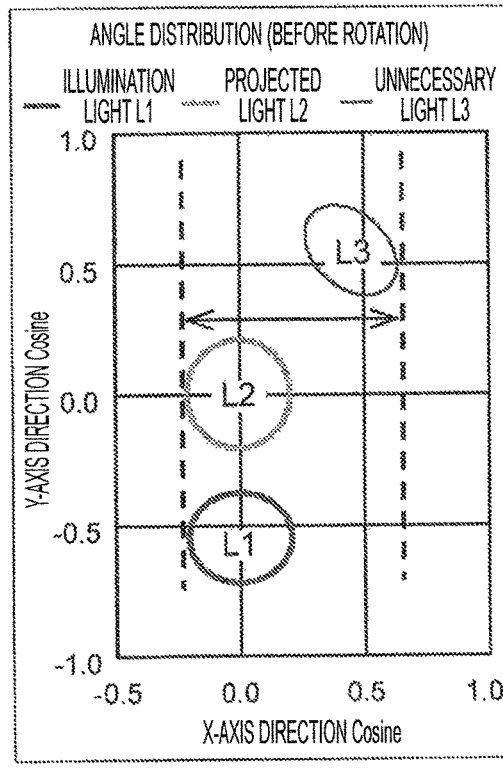
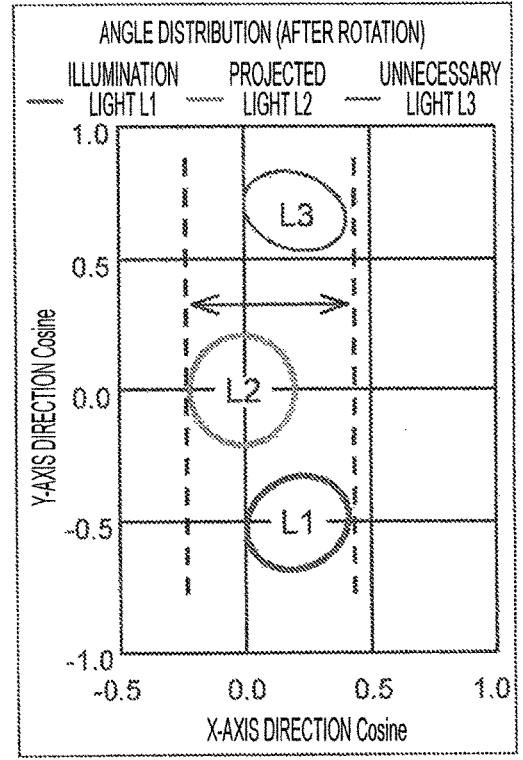

IMAGE PROJECTION OPTICAL UNIT AND PROJECTOR

RELATED APPLICATIONS

This is a U.S. National Phase Application under 35 USC 371 of International Application PCT/JP2015/066893 filed on Jun. 11, 2015.

This application claims the priority of Japanese application no. 2014-126909 filed Jun. 20, 2014, the entire content of which is hereby incorporated by reference.

TECHNICAL FIELD

The present invention relates to an image projection optical unit and a projector, and relates to, for example, an image projection optical unit including a digital micromirror device that drives micromirrors with respect to two axes orthogonal to each other, and a three-plate projector including the image projection optical unit.

BACKGROUND ART

A digital micromirror device is known as a reflective image display element mounted on a projector. The digital micromirror device includes an image display surface formed with a plurality of microscopic micromirrors. On the image display surface, the digital micromirror device controls an inclination of each mirror surface to modulate an intensity of illumination light, thereby forming an image. That is, ON/OFF of each pixel of the digital micromirror device is indicated, for example, by turning the mirror surface at ±12° around a rotation axis forming an angle of 45° with respect to each side of the image display surface (that is, by driving the micromirrors with respect to one axis). In regards to the movement of the micromirrors, a new operation type digital micromirror device that drives the micromirrors with respect to two axes orthogonal to each other (Tilt & Roll Pixel DMD) is also proposed in Non Patent Literature 1.

In the reflective image display element such as the digital micromirror device, unnecessary light called OFF light which is not used in a projected image is generated. The OFF light becomes stray light and causes a contrast reduction of the projected image, or causes a temperature rise of the optical unit including a mechanical component. Therefore, in a projector using the digital micromirror device, it is important to process the OFF light incident on a prism and thus, various countermeasures have been proposed. For example, in Patent Literature 1, there has been proposed a configuration of causing a heat releasing body to absorb the OFF light. In addition, in Patent Literature 2, there has been proposed a configuration of separating the OFF light from projected light by increasing a height of a synthesizing prism to secure an optical path of the OFF light.

CITATION LIST

Patent Literature

Patent Literature 1: JP 2004-309941 A
Patent Literature 2: JP 2005-300991 A

Non Patent Literature

Non Patent Literature 1: DLP Tilt & Roll Pixel Architecture and DLP IntelliBright™, Internet <URL: http://www.dlp.com/pico-projector/pico-product-developers/2trp-chip.aspx>

SUMMARY OF INVENTION

Technical Problem

For example, in a case of using a cross prism for color synthesis, there is a possibility that a problem occurs in bonding at a bonding surface of the cross prism if the heat releasing body proposed in Patent Literature 1 is used. Moreover, as proposed in Patent Literature 2, securing the optical path of the OFF light only by simply increasing the height of the synthesizing prism is only applicable to a case of using the digital micromirror device that drives micromirrors with respect to one axis. For example, in a case of using a new operation type digital micromirror device that drives micromirrors with respect to two axes orthogonal to each other, the OFF light proceeds in a direction out of a plane including an optical axis of illumination light and an optical axis of projected light. Therefore, the OFF light incident on an unexpected surface may cause a temperature rise in the prism, or may become stray light and cause a contrast reduction of a projected image.

The present invention has been made in view of the circumstances described above, and an object thereof is to provide an image projection optical unit that can properly perform spatial separation of OFF light unnecessary for image projection from ON light necessary for the image projection among light emitted from a digital micromirror device that drives micromirrors with respect to two axes, and to provide a projector including the image projection optical unit.

Solution to Problem

In order to achieve the object described above, the optical unit of a first invention includes a digital micromirror device configured to form an image by modulating an intensity of illumination light while subjecting an inclination of each micromirror surface to ON/OFF control in an image display surface including a plurality of micromirrors and, at the time of forming the image, drive the micromirrors subjected to the ON/OFF control with respect to two axes, and a prism optical system configured to emit, to an image projection side, ON light reflected at the micromirror in an ON state among emitted light the intensity of which has been modulated by the digital micromirror device.

In addition, an optical path, which is configured to emit, to the image projection side in a direction different from the ON light, OFF light reflected at the micromirror in an OFF state among the emitted light the intensity of which has been modulated by the digital micromirror device, is secured in the prism optical system.

According to the optical unit of a second invention, in the first invention, the prism optical system includes a TIR prism and a color synthesizing cross prism, and the TIR prism is disposed between the digital micromirror device and the color synthesizing cross prism.

According to the optical unit of a third invention, in the second invention, a side surface of the TIR prism on which the OFF light is incident is a reflecting surface.

According to the optical unit of a fourth invention, in the third invention, the reflecting surface has a total reflection characteristic with respect to the OFF light.

According to the optical unit of a fifth invention, in any one of the second to fourth inventions, a height of the color synthesizing cross prism is set so that the OFF light reflected at an upper surface of the color synthesizing cross prism can be separated from the ON light on an emission surface of the color synthesizing cross prism.

According to the optical unit of a sixth invention, in any one of the second to fifth inventions, the following conditional expression (1) is satisfied:

$$H \geq (h1+h2)/2 - h3 + m \quad (1)$$

where $$h1 = Y1 + X1 \cdot \tan \alpha1 + X2 \cdot \tan \alpha2 + X3 \cdot \tan \alpha3 + X4 \cdot \tan \alpha4$$

$$h2 = Y1 + X1 \cdot \tan \beta1 + X2 \cdot \tan \beta2 + X3 \cdot \tan \beta3 + X4 \cdot \tan \beta4$$

$$h3 = Y1 + X1 \cdot \tan \gamma1 + X2 \cdot \tan \gamma2 + X3 \cdot \tan \gamma3 + X4 \cdot \tan \gamma4$$

$$\alpha2 = \sin^{-1}\{(n1/n2) \cdot \sin \alpha1\}$$

$$\alpha3 = \sin^{-1}\{(n2/n3) \cdot \sin \alpha2\}$$

$$\alpha4 = \sin^{-1}\{(n3/n4) \cdot \sin \alpha3\}$$

$$\beta2 = \sin^{-1}\{(n1/n2) \cdot \sin \beta1\}$$

$$\beta3 = \sin^{-1}\{(n2/n3) \cdot \sin \beta2\}$$

$$\beta4 = \sin^{-1}\{(n3/n4) \cdot \sin \beta3\}$$

$$\gamma2 = \sin^{-1}\{(n1/n2) \cdot \sin \gamma1\}$$

$$\gamma3 = \sin^{-1}\{(n2/n3) \cdot \sin \gamma2\}$$

$$\gamma4 = \sin^{-1}\{(n3/n4) \cdot \sin \gamma3\}, \text{ and}$$

the digital micromirror device includes a cover slip on the image display surface and, when the color synthesizing cross prism is viewed from the side, Y1: a distance from the center of the image display surface to a pixel that is farthest away upward from the center, α1: an angle formed between a ray of the ON light away upward from the center of the image display surface by the distance Y1, and an optical axis of projected light, β1: an angle formed between a ray of the OFF light away upward from the center of the image display surface by the distance Y1, and the optical axis of the projected light, γ1: an angle formed between a ray of the ON light away downward from the center of the image display surface by the distance Y1, and the optical axis of the projected light (in the reverse direction from α1 and β1 and represented in a negative value), X1: a distance from the image display surface to the cover slip, n1: a refractive index between the image display surface and the cover slip, X2: a thickness of the cover slip, n2: a refractive index of the cover slip, X3: a distance from the cover slip to the TIR prism, n3: a refractive index between the cover slip and the TIR prism, X4: a thickness from the TIR prism to the color synthesizing cross prism, n4: a refractive index between the TIR prism and the color synthesizing cross prism, m: a margin at the time of manufacture, and H: a height of the color synthesizing cross prism.

The optical unit of a seventh invention, in any one of the second to sixth inventions, includes an air gap layer between the TIR prism and the color synthesizing cross prism.

According to the optical unit of an eighth invention, in the first invention, the prism optical system is a color separating/synthesizing prism having, in order of incidence of the illumination light, a first dichroic coating and a second dichroic coating, the digital micromirror device includes a first digital micromirror device on which the illumination light reflected at the first dichroic coating is incident, a second digital micromirror device on which the illumination light reflected at the second dichroic coating is incident, and a third digital micromirror device on which the illumination light having passed through the first and second dichroic coatings is incident, and when a first plane is defined as a plane including the optical axis of the illumination light and the optical axis of the projected light on the image display surface of the third digital micromirror device and a second plane is defined as a plane including surface normals of the first and second dichroic coatings, the optical path of the OFF light from the digital micromirror device is secured in the color separating/synthesizing prism through relative rotation of the first plane and the second plane from a state where the first plane and the second plane are orthogonal to each other.

A three-plate projector of a ninth invention includes a light source, an illumination optical system configured to collect light from the light source and emit illumination light, the optical unit according to any one of the first to eighth inventions, and a projection optical system configured to project an image, displayed on the digital micromirror device, onto a screen in an enlarged manner.

Advantageous Effects of Invention

The optical unit of the present invention can properly perform spatial separation of OFF light unnecessary for image projection from ON light necessary for the image projection among light emitted from a digital micromirror device that drives micromirrors with respect to two axes. As a result, it becomes possible to prevent a temperature rise and generation of stray light due to the OFF light. Furthermore, a high contrast three-plate projector with stable performance can be realized by equipping the projector with the optical unit.

BRIEF DESCRIPTION OF DRAWINGS

FIG. 10 is a diagram illustrating spreading angle distribution of rays of the illumination light, projected light, and unnecessary light before and after relative rotation of first and second planes from a state where the first and second planes are orthogonal to each other in the third embodiment.

DESCRIPTION OF EMBODIMENTS

Hereinafter, embodiments or the like of an image projection optical unit and a projector according to the present invention will be described with reference to the drawings. Same reference signs denote portions in the embodiments or the like that are similar or corresponding to each other, and overlapping description will be omitted appropriately.

As described above, ON/OFF of each pixel of a digital micromirror device conventionally well known is indicated, for example, by turning the mirror surface at ±12° around a rotation axis forming an angle of 45° with respect to each side of an image display surface. Therefore, illumination light, projected light (ON light), and unnecessary light (OFF light) are positioned on the same plane. Accordingly, by increasing a height of a prism optical system used for color synthesis or the like, the unnecessary light can be easily discharged from the prism optical system.

On the other hand, in a new operation type digital micromirror device (see Non Patent Literature 1 or the like), mirror surface turning is not around one rotation axis but is around two rotation axes orthogonal to each other. Therefore, it is difficult to discharge the unnecessary light from the prism optical system without any problem only by simply increasing the height of the prism optical system. The image projection optical unit according to the present invention can properly process the unnecessary light generated in the new operation type digital micromirror device. In order to describe the effect, the new operation type digital micromirror device will be described first.

Figure 3:
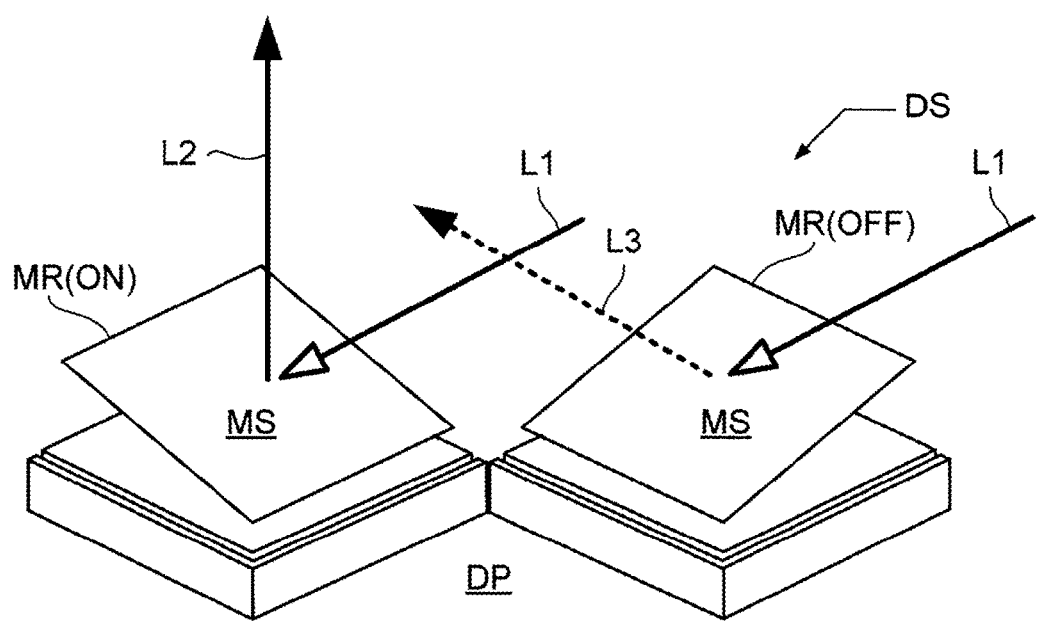
FIG. 3 is a perspective view for describing an operation of a digital micromirror device that drives micromirrors with respect to two axes orthogonal to each other.
Figure 4:
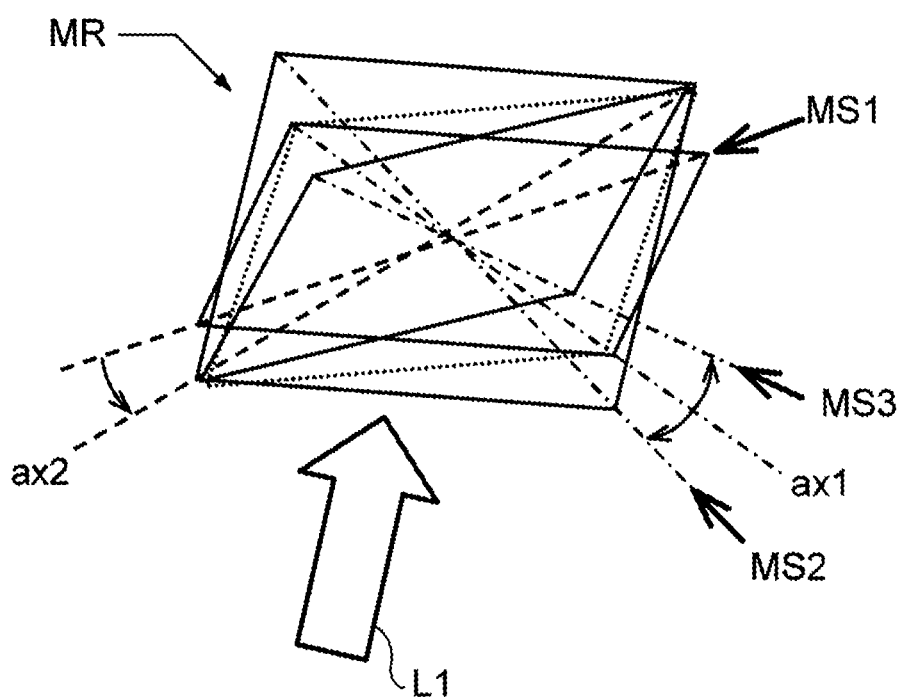
FIG. 4 is a perspective view illustrating a reference state, an ON state, and an OFF state of the micromirror in FIG. 3.

FIG. 3 illustrates an ON state and an OFF state of a pixel formed, by a micromirror MR, on a rectangular pixel reflecting surface (micromirror surface) MS. In addition, FIG. 4 illustrates a reference state of the micromirror MR as a reference plane MS1, the ON state of the micromirror MR as an ON reflecting surface MS2, and the OFF state of the micromirror MR as an OFF reflecting surface MS3. A digital micromirror device DP is configured to drive micromirrors with respect to two axes orthogonal to each other. Therefore, as illustrated in FIG. 4, the micromirror MR can turn around a second axis ax2 after inclining to a first axis ax1. Accordingly, in an image display surface DS including the plurality of pixel reflecting surfaces MS, the digital micromirror device DP (FIG. 3) can form a desired image by modulating an intensity of illumination light L1 while subjecting the pixel reflecting surface MS to ON/OFF control and causing the micromirror MR to be in two angle states, i.e., an image displaying state (ON state) and an image non-displaying state (OFF state).

Since the micromirrors are driven with respect to two axes orthogonal to each other as described above, in the pixel reflecting surface MS of the micromirror MR, as illustrated in FIG. 3, a state of inclining in a direction of one side is the ON state, and a state of inclining in a direction of a side perpendicular to the one side is the OFF state. In the ON/OFF control which is normally expected, when the pixel reflecting surface MS is in the ON state, the illumination light L1 incident on the micromirror MR becomes ON light (projected light) L2 by being reflected in a normal direction of the image display surface DS. On the other hand, when the pixel reflecting surface MS is in the OFF state, the illumination light L1 incident on the micromirror MR becomes OFF light (unnecessary light) L3 by being reflected, at a large angle, from the normal direction of the image display surface DS.

Figure 5:
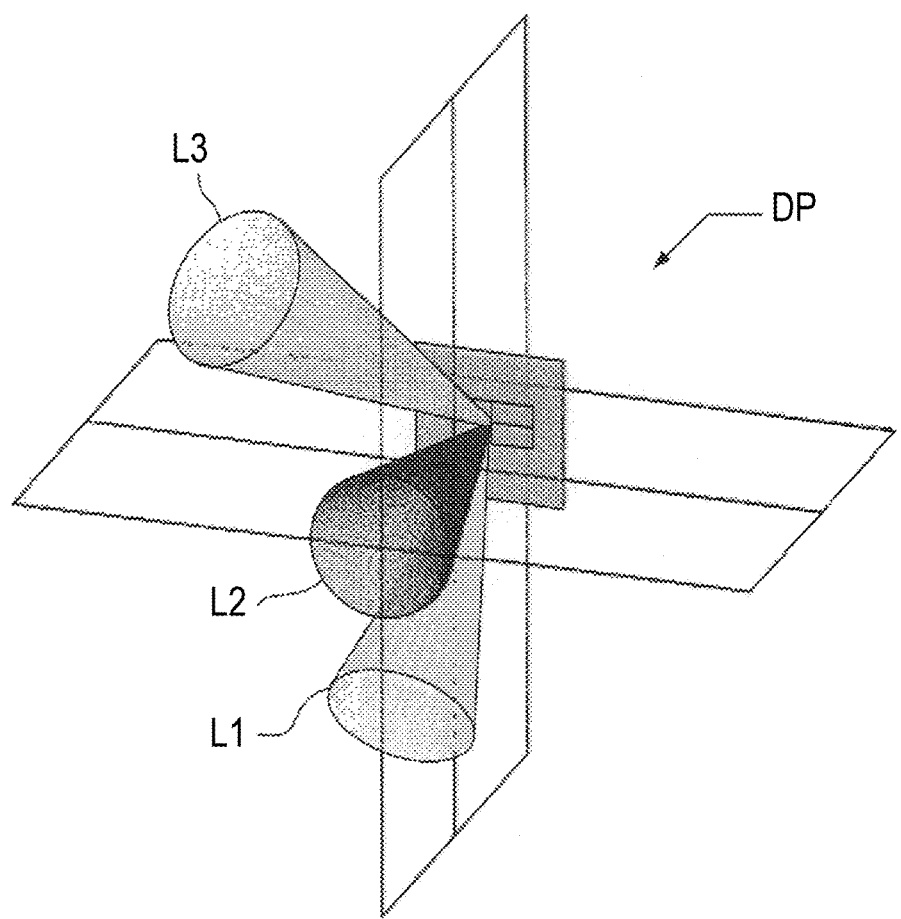
FIG. 5 is a schematic view illustrating illumination light on the micromirror in FIG. 3, ON light reflected at the micromirror in the ON state, and OFF light reflected at the micromirror in the OFF state.

As a result, the OFF light (unnecessary light) L3 proceeds in a direction different from a plane including the illumination light L1 and the ON light (projected light) L2 as illustrated in FIG. 5. Accordingly, in the prism optical system using the digital micromirror device DP, it is difficult to secure an optical path of the OFF light L3 and thus, the OFF light L3 that is not able to be discharged from the prism causes a temperature rise of the prism and generation of ghost light. In order to properly process the OFF light L3 so that the problems described above do not occur, in the embodiments described below, an optical path configured to emit the OFF light L3 to an image projection side in a direction different from the ON light L2 is secured in the prism optical system.

Figure 1A:
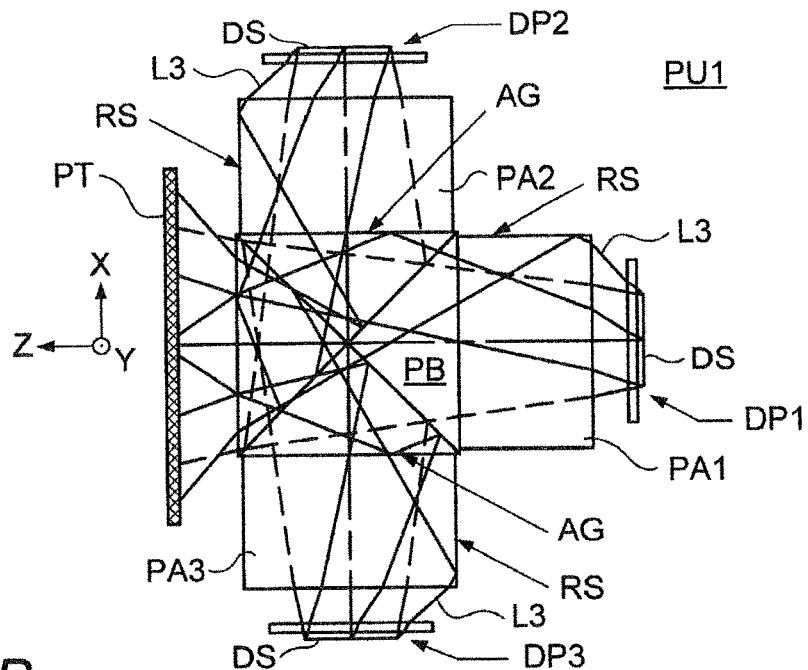
FIG. 1 is a schematic configuration view illustrating an optical unit in a first embodiment.
Figure 1B:
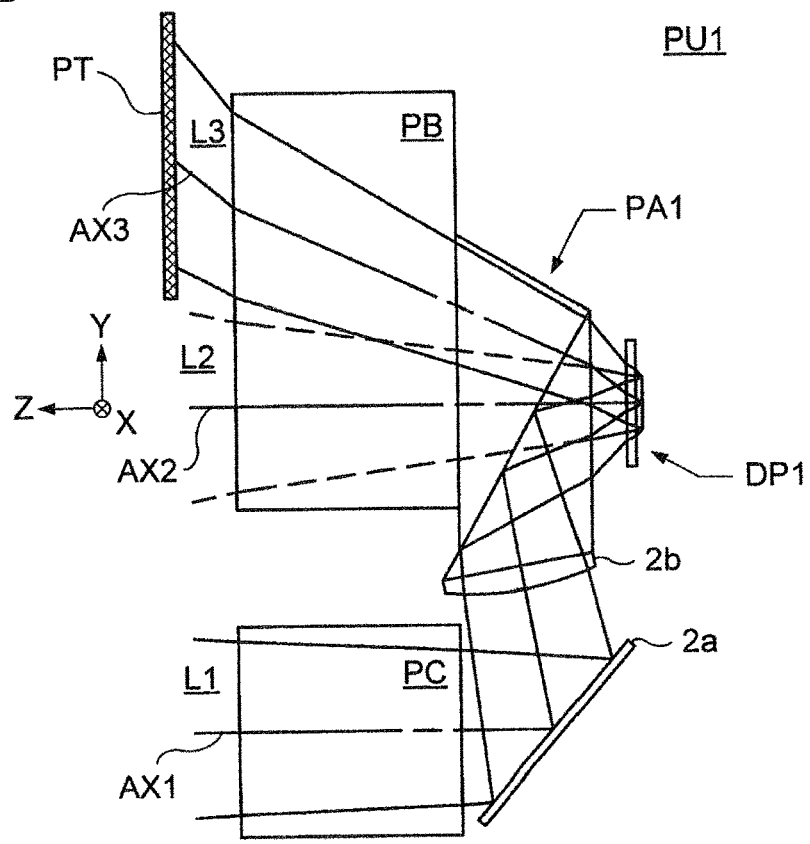

FIG. 1 illustrates an optical unit PU1 according to a first embodiment. FIG. 1A illustrates the optical unit PU1 as viewed from an upper side, and FIG. 1B illustrates the optical unit PU1 as viewed from a lateral side. In FIG. 1, a Z direction is a normal direction of an image display surface DS of a digital micromirror device DP1, an X direction is a normal direction of image display surfaces DS of digital micromirror devices DP2, DP3, and a Y direction is a direction parallel to the image display surfaces DS of the digital micromirror devices DP1 to DP3.

Figure 2:
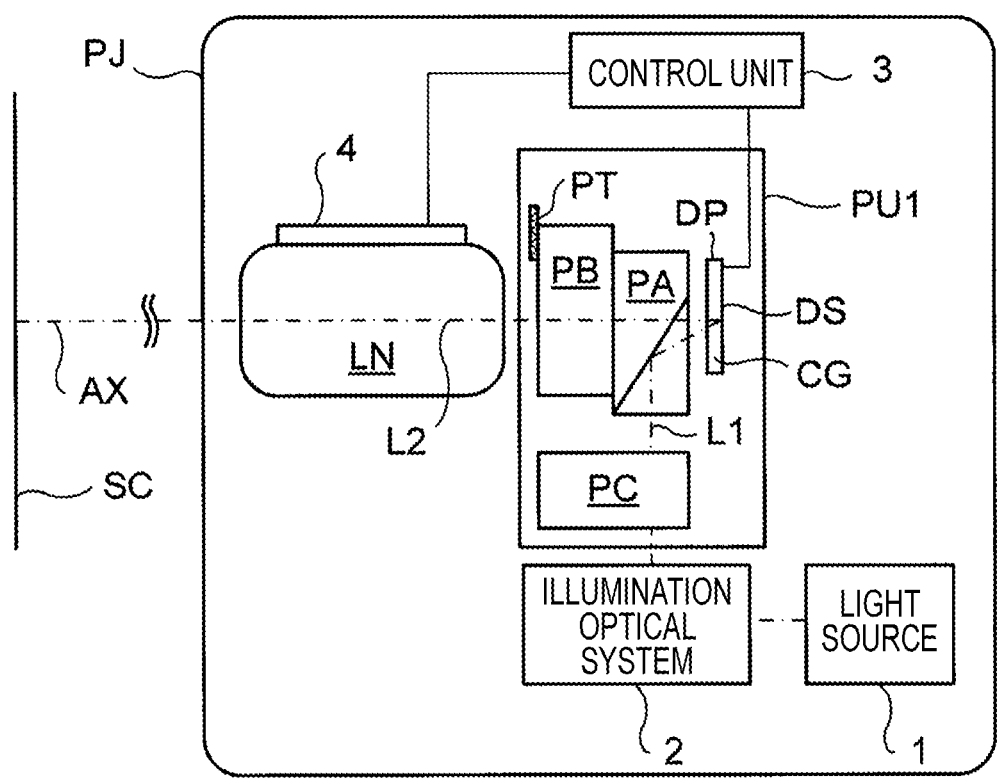
FIG. 2 is a schematic diagram illustrating an exemplary configuration of a projector equipped with the optical unit in FIG. 1.

FIG. 2 illustrates an exemplary schematic configuration of a projector PJ equipped with the optical unit PU1. As illustrated in FIG. 2, the projector PJ includes a projection optical system LN, the optical unit PU1, a light source 1, an illumination optical system 2, a control unit 3, an actuator 4, and the like. The optical unit PU1 includes a total internal reflection (TIR) prism PA, a color synthesizing cross prism PB, a color separating cross prism PC, the digital micromirror device DP, and the like. The projector PJ overall is controlled by the control unit 3.

As illustrated in FIG. 2, the illumination light L1 emitted from the light source 1 is directed through the illumination optical system 2, the color separating cross prism PC, and the TIR prism PA to the digital micromirror device DP. The digital micromirror device DP is a reflective image display element configured to modulate light to generate an image. A cover slip CG is provided on the image display surface DS that displays an image. On the image display surface DS of the digital micromirror device DP, a two-dimensional image is formed by modulating the intensity of the illumination light L1. The digital micromirror device DP indicates ON/OFF by driving the micromirrors with respect to two axes orthogonal to each other as described above. Thereafter, only light reflected at the pixel reflecting surface MS of the micromirror MR in the ON state illustrated in FIG. 3 passes through the optical unit PU1 and the projection optical system LN as described later.

As illustrated in FIG. 1, the optical unit PU1 is a three-plate image projection optical unit. That is, the optical unit PU1 is a prism system including three digital micromirror devices DP1 to DP3 (which correspond to the digital micromirror device DP in FIG. 2), three TIR prisms PA1 to PA3 (which correspond to the TIR prism PA in FIG. 2), one color synthesizing cross prism PB, and one color separating cross prism PC. The TIR prisms PA1 to PA3 are disposed between the color synthesizing cross prism PB and the digital micromirror devices DP1 to DP3, respectively. The illumination light L1 separated into three colors in the color separating cross prism PC is reflected at a reflecting mirror 2a, passes through a relay lens 2b, is incident on each of the TIR prisms PA1 to PA3, and is directed to each of the digital micromirror devices DP1 to DP3.

The ON light (projected light) L2 reflected at the micromirror MR in the ON state on the image display surface DS of each of the digital micromirror devices DP1 to DP3 is incident on the color synthesizing cross prism PB via each of the TIR prisms PA1 to PA3, respectively. At this time, the TIR prisms PA1 to PA3 separate the illumination light L1 and the ON light L2 FIG. 1B, and the ON light L2 of respective colors are synthesized by the color synthesizing cross prism PB. The color-synthesized ON light L2 is emitted from the color synthesizing cross prism PB and projected onto a screen SC via the projection optical system LN. That is, an image displayed on each of the digital micromirror devices DP1 to DP3 is magnified and projected onto the screen SC at the projection optical system LN. Movement (for example, zooming and focusing) of the projection optical system LN or a portion of the projection optical system LN is performed at the actuator 4 (FIG. 2).

In the TIR prisms PA1 to PA3 and the color synthesizing cross prism PB included in the prism optical system, the optical path configured to emit the OFF light L3 to an image projection side in a direction different from the ON light L2 is secured. By discharging the OFF light L3 from the side of the projection optical system LN while suppressing a back focal length of the projection optical system LN (distance from a last lens surface to the image display surface DS), the optical path makes it possible to perform optical-path separation between the projected light (ON light) L2 suitable for the digital micromirror devices DP1 to DP3 that drive the micromirrors with respect to two axes orthogonal to each other, and the unnecessary light (OFF light) L3.

The optical path is formed by setting a height and the like of the color synthesizing cross prism PB so that the OFF light L3 is reflected at side surfaces of the TIR prisms PA1 to PA3 and the color synthesizing cross prism PB and further, that the OFF light L3 emitted from the side of the projection optical system LN of the color synthesizing cross prism PB is absorbed by a light shielding plate PT. Therefore, in order to form the optical path as described above, it is preferable to dispose the TIR prisms PA1 to PA3 between the digital micromirror devices DP1 to DP3 and the color synthesizing cross prism PB, respectively.

The optical unit PU1 can properly perform spatial separation of the OFF light L3 unnecessary for image projection from the ON light L2 necessary for the image projection among the light emitted from the digital micromirror devices DP1 to DP3 that drive micromirrors with respect to two axes. As a result, it becomes possible to prevent a temperature rise and generation of stray light due to the OFF light L3. Moreover, stable and high contrast performance of the three-plate projector PJ can be achieved by equipping the projector PJ with the optical unit PU1.

A portion of the OFF light (unnecessary light) L3 reflected at the micromirror MR in the OFF state on the image display surface DS of each of the digital micromirror devices DP1 to DP3 is incident on a side surface of each of the TIR prisms PA1 to PA3, respectively, as illustrated in FIG. 1A. The side surface of each of the TIR prisms PA1 to PA3 on which the OFF light L3 is incident is formed of a reflecting surface RS. By forming the side surface of each of the TIR prisms PA1 to PA3 with the reflecting surface RS, a temperature rise due to scattering and absorption of light at the side surface can be suppressed.

The reflecting surface RS, which is formed on the side surface of each of the TIR prisms PA1 to PA3 and on which the portion of the OFF light L3 is incident, may be a total reflecting surface or a mirror coat surface. For example, by polishing the side surface of each of the TIR prisms PA1 to PA3 so that the reflecting surface RS has a total reflection characteristic with respect to the OFF light L3, the OFF light L3 can be reflected using a total reflection angle. As a result, a temperature rise due to the OFF light L3 and the OFF light L3 becoming stray light can be effectively prevented.

Figure 6A:
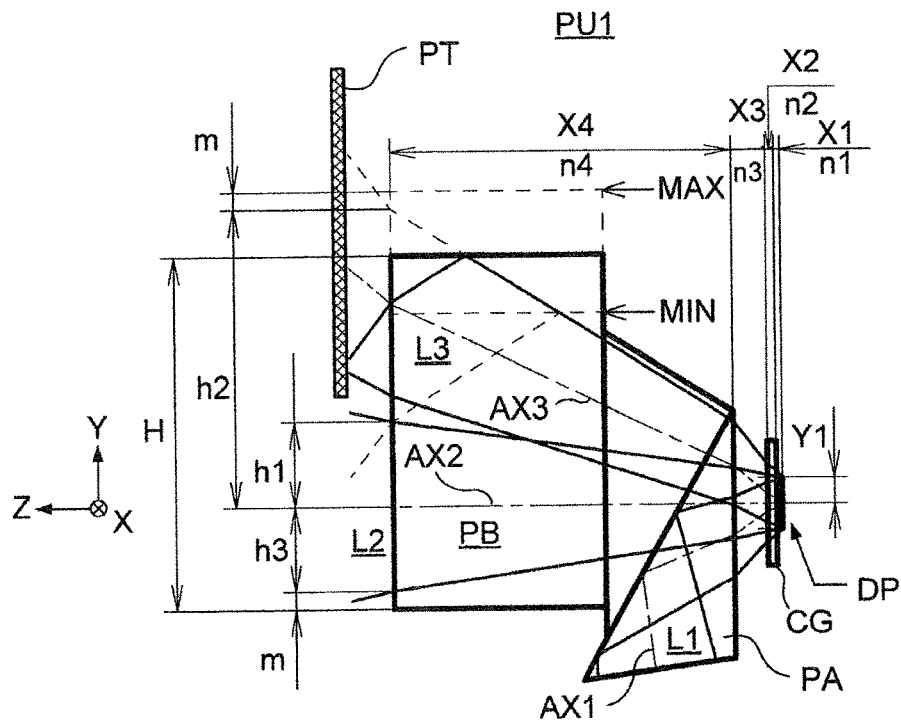
FIG. 6 is a side view for describing optimization of an optical path of the OFF light to be secured in the prism optical system of the optical unit in the first embodiment.
Figure 6B:
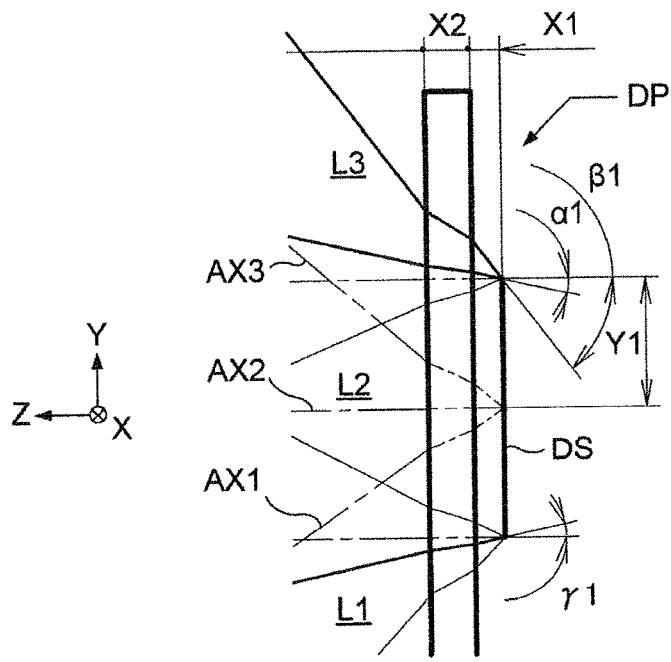

In order to optimize the optical path of the OFF light L3, it is preferable to set the height of the color synthesizing cross prism PB so that the OFF light L3 reflected at an upper surface of the color synthesizing cross prism PB can be separated from the ON light L2 on an emission surface of the color synthesizing cross prism PB. To describe the optimization of the optical path of the OFF light L3, FIG. 6A illustrates a schematic side view of the optical unit PU1 and FIG. 6B illustrates a main part thereof. As illustrated in FIG. 6, the OFF light L3 proceeds on an upper side of the ON light L2; therefore, it is necessary to secure the optical path of the OFF light L3 not only in the TIR prism PA but also in the color synthesizing cross prism PB.

To secure the optical path of the OFF light L3, it is preferable to satisfy the following conditional expression (1):

$$H \geq (h1+h2)/2 - h3 + m \quad (1)$$

where $h1 = Y1 + X1 \cdot \tan \alpha1 + X2 \cdot \tan \alpha2 + X3 \cdot \tan \alpha3 + X4 \cdot \tan \alpha4$ $h2 = Y1 + X1 \cdot \tan \beta1 + X2 \cdot \tan \beta2 + X3 \cdot \tan \beta3 + X4 \cdot \tan \beta4$ $h3 = Y1 + X1 \cdot \tan \gamma1 + X2 \cdot \tan \gamma2 + X3 \cdot \tan \gamma3 + X4 \cdot \tan \gamma4$ $\alpha2 = \sin^{-1}\{(n1/n2) \cdot \sin \alpha1\}$ $\alpha3 = \sin^{-1}\{(n2/n3) \cdot \sin \alpha2\}$ $\alpha4 = \sin^{-1}\{(n3/n4) \cdot \sin \alpha3\}$ $\beta2 = \sin^{-1}\{(n1/n2) \cdot \sin \beta1\}$ $\beta3 = \sin^{-1}\{(n2/n3) \cdot \sin \beta2\}$ $\beta4 = \sin^{-1}\{(n3/n4) \cdot \sin \beta3\}$ $\gamma2 = \sin^{-1}\{(n1/n2) \cdot \sin \gamma1\}$ $\gamma3 = \sin^{-1}\{(n2/n3) \cdot \sin \gamma2\}$ $\gamma4 = \sin^{-1}\{(n3/n4) \cdot \sin \gamma3\}$, and the digital micromirror device DP includes the cover slip CG on the image display surface DS and, when the color synthesizing cross prism PB is viewed from the side (that is, in a plane including an optical axis AX1 of the illumination light L1 and an optical axis AX2 of the ON light L2 (which corresponds to the drawing sheet of FIG. 6)), Y1: a distance (mm) from the center of the image display surface DS to a pixel that is farthest away upward from the center, α1: an angle (°) formed between a ray of the ON light L2 away upward from the center of the image display surface DS by the distance Y1, and the optical axis AX2 of the projected light L2, β1: an angle (°) formed between a ray of the OFF light L3 away upward from the center of the image display surface DS by the distance Y1, and the optical axis AX2 of the projected light L2, γ1: an angle (°) formed between a ray of the ON light L2 away downward from the center of the image display surface DS by the distance Y1, and the optical axis AX2 of the projected light L2 (in the reverse direction from α1 and β1 and represented in a negative value), X1: a distance (mm) from the image display surface DS to the cover slip CG, n1: a refractive index between the image display surface DS and the cover slip CG, X2: a thickness (mm) of the cover slip CG, n2: a refractive index of the cover slip CG, X3: a distance (mm) from the cover slip CG to the TIR prism PA, n3: a refractive index between the cover slip CG and the TIR prism PA, X4: a thickness (mm) from the TIR prism PA to the color synthesizing cross prism PB, n4: a refractive index between the TIR prism PA and the color synthesizing cross prism PB, m: a margin (mm) at the time of manufacture, and H: a height (mm) of the color synthesizing cross prism PB.

When the height H of the color synthesizing cross prism PB satisfies at least the conditional expression (1), the OFF light L3 reflected at the upper surface of the color synthesizing cross prism PB can also be separated from the ON light L2 at the emission surface of the color synthesizing cross prism PB. Therefore, the OFF light L3 being incident on the projection optical system LN can be prevented at the light shielding plate PT.

Moreover, it is preferable to satisfy the following conditional expression (2). When the height H of the color synthesizing cross prism PB also satisfies the conditional expression (2), the OFF light L3 can be discharged from the emission surface of the color synthesizing cross prism PB without being incident on the upper surface of the color synthesizing cross prism PB.

$$h2-h3+2\cdot \geq H \quad (2)$$

In regards to the optimization of the optical path of the OFF light L3, corresponding values of the conditional expressions (1), (2) in the optical unit PU1 are indicated below with specific numerical values (FIG. 6).

n1=1.0
n2=1.487
n3=1.0
n4=1.51872
X1=0.5 mm
X2=1.0 mm
X3=4.0 mm
X4=40.0 mm
α1=12.03°
α2=8.06°
α3=12.03°
α4=7.89°
β1=51.16°
β2=31.59°
β3=51.16°
β4=30.85°
γ1=-12.03°
γ2=-8.06°
γ3=-12.03°
γ4=-7.89°
Y=3.0 mm
h1=9.64 mm
h2=33.10 mm
h3=-9.64 mm
m=2.0 mm
(h1+h2)/2-h3+m
=(9.64+33.10)/2-(-9.64)+2.0
=33.01
h2-h3+2·m
=33.10-(-9.64)+2·2.0
=46.74
(h1+h2)/2-h3+m≤H≤h2-h3+2·m
33.01≤H≤46.74

From the calculation results of data above, when Y=3.0 mm, α1=12.03°, β1=51.16°, γ1=-12.03°, n1=1.0, n2=1.487, n3=1.0, n4=1.51872, X1=0.5 mm, X2=1.0 mm, X3=4.0 mm, and X4=40.0 mm, and if the margin at the time of manufacture is m=2.0 mm, an optimal height of the color synthesizing cross prism PB is 33.01 mm to 46.74 mm.

As illustrated in FIG. 1A, it is preferable to include an air gap layer AG between each of the TIR prisms PA2, PA3 and the color synthesizing cross prism PB. By providing the air gap layer AG between each of the TIR prisms PA2, PA3 and the color synthesizing cross prism PB, the OFF light L3 incident on the color synthesizing cross prism PB can be totally reflected and discharged from the emission surface of the color synthesizing cross prism PB without being incident again on the TIR prisms PA1 to PA3. Accordingly, the light shielding plate PT can be made compact and thus, the light shielding plate PT is easily disposed.

Figure 7:
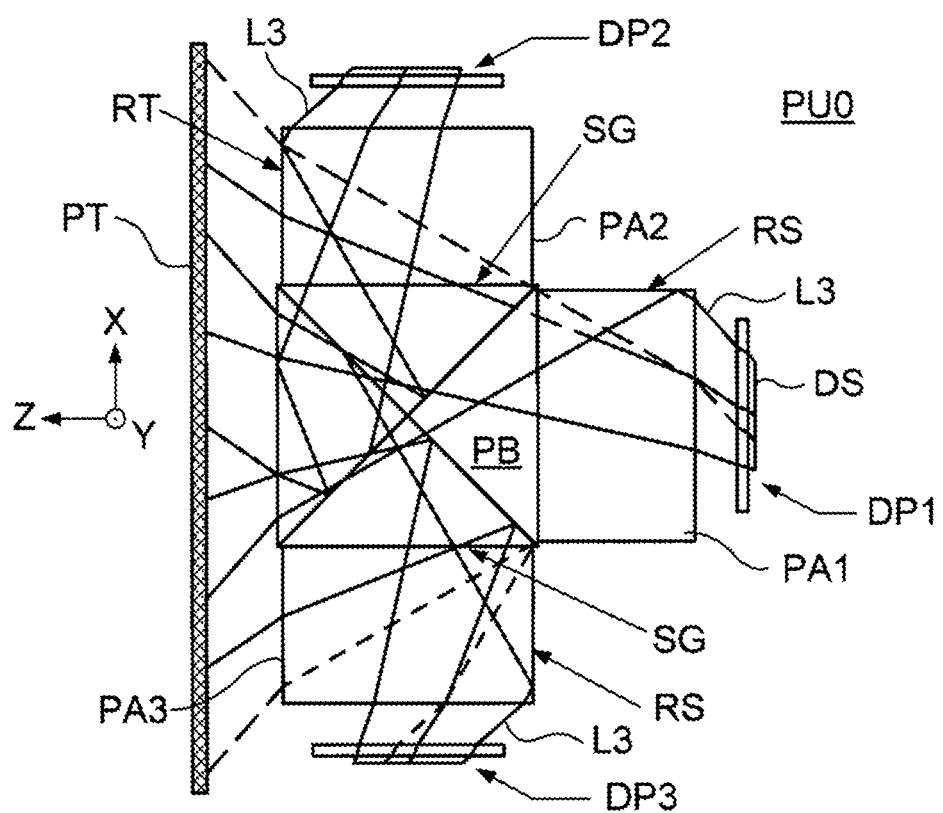
FIG. 7 is a top view of the optical path of the OFF light illustrating, for comparison, a case where an air gap layer is not present in the first embodiment.

FIG. 7 illustrates, for comparison, the optical path of the OFF light L3 in a case where the air gap layer AG (FIG. 1A) is not present in the optical unit PU1. In a case where each of the TIR prisms PA1 to PA3 and the color synthesizing cross prism PB are bonded together using an adhesive (adhesive with a refractive index close to that of the prism), since there is no air gap layer AG therebetween, the OFF light L3 is not totally reflected at a bonding surface SG. For example, the OFF light L3 that has passed through the TIR prism PA1 passes through the color synthesizing cross prism PB and is incident on the TIR prism PA2. In order to discharge the OFF light L3 incident on the TIR prism PA2 to the side of the projection optical system LN (that is, the side of the light shielding plate PT), it is preferable to make the side surface of the TIR prism PA2 on the side of the projection optical system LN as a transparent surface RT capable of total reflection. At this time, it is necessary to increase the height of the TIR prism PA2 to have almost the same height as the color synthesizing cross prism PB in order to secure the optical path of the OFF light L3.

Figure 8:
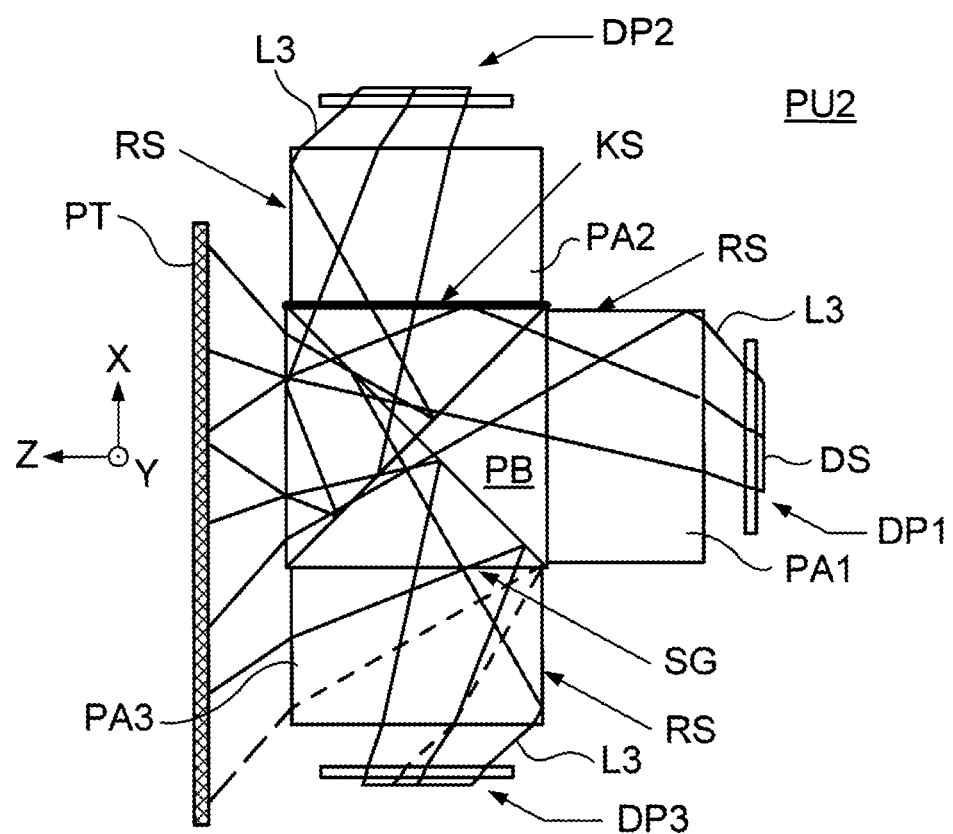
FIG. 8 is a schematic configuration view illustrating an optical unit in a second embodiment.

Even in a case of bonding the TIR prisms PA1 to PA3 and the color synthesizing cross prism PB, it is possible to discharge the OFF light L3 from the emission surface of the color synthesizing cross prism PB as long as a functional film that reflects the OFF light L3 is disposed on the bonding surface SG. FIG. 8 illustrates an optical unit PU2 including the functional film as a second embodiment. In the optical unit PU2 illustrated in FIG. 8, a dichroic coating KS is disposed as the functional film that reflects the OFF light L3. In a case where the digital micromirror devices DP1, DP2, and DP3 correspond to G (green), R (red), and B (blue) respectively, it is possible to discharge the OFF light L3 of G from the emission surface of the color synthesizing cross prism PB by providing the dichroic coating KS that reflects G and transmits R.

Figure 9A:
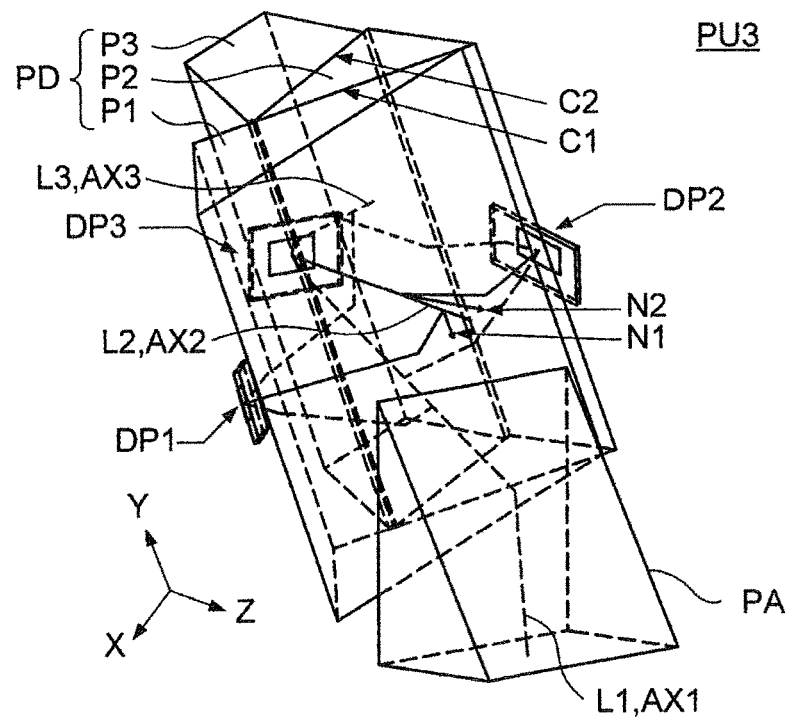
FIG. 9 is a schematic configuration view illustrating an optical unit in a third embodiment.
Figure 9B:
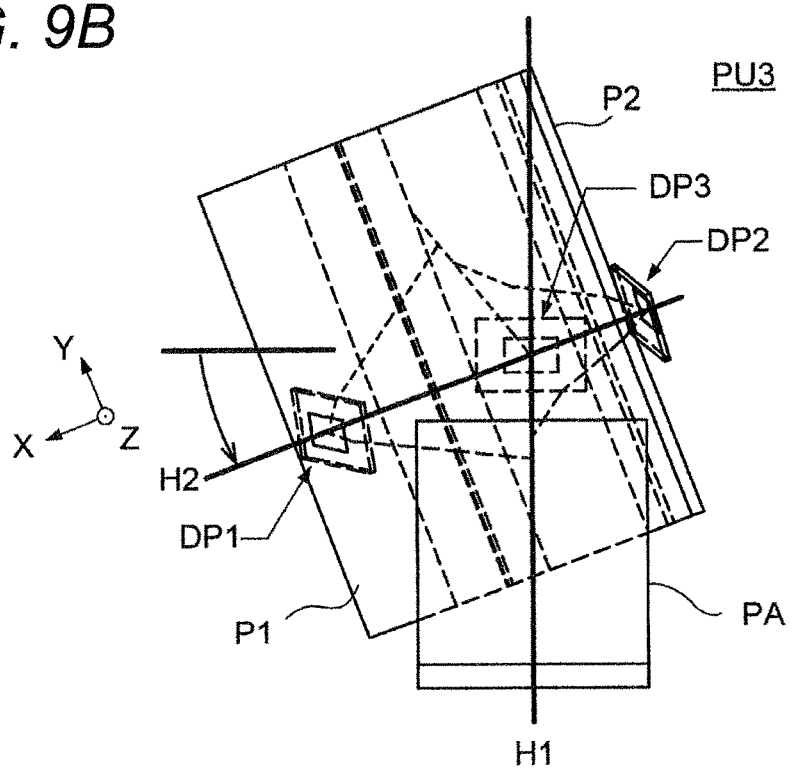

FIG. 9 illustrates an optical unit PU3 according to a third embodiment. FIG. 9A illustrates the optical unit PU3 as viewed obliquely from above, and FIG. 9B illustrates the optical unit PU3 as viewed from the normal direction of the image display surface DS of the digital micromirror device DP3. In FIG. 9, a Z direction is the normal direction of the image display surface DS of the digital micromirror device DP3, an Y direction is a direction parallel to the image display surfaces DS of the digital micromirror devices DP1 to DP3, and an X direction is a normal direction of a plane including the Z direction and the Y direction.

The optical unit PU3 has a prism configuration which includes the TIR prism PA, and a so-called Philips prism type color separating/synthesizing prism PD. The TIR prism PA is a substantially triangular single prism. Using the TIR prism PA, the illumination light L1 on the first to third digital micromirror devices DP1 to DP3 is separated from the projected light (ON light) L2. The illumination light L1 emitted from the illumination optical system 2 (FIG. 2) is incident on the TIR prism PA as illustrated in FIG. 9A, incident on an inclined surface at an angle that satisfies a total reflection condition, totally reflected, and incident on the color separating/synthesizing prism PD.

The color separating/synthesizing prism PD has a configuration in which three prisms P1, P2, and P3 that correspond to B (blue), R (red), and G (green) respectively (FIG. 9A) are combined. The three prisms P1, P2, and P3 are substantially triangular blue prism and red prism, and a block-shaped green prism, respectively. The color separating/synthesizing prism PD has, in order of incidence of the illumination light L1, a first dichroic coating C1 and a second dichroic coating C2. Specifically, the first dichroic coating C1 that reflects blue light and an air gap layer adjacent to the first dichroic coating C1 are provided between the prism P1 and the prism P2. In addition, the second dichroic coating C2 that reflects red light and an air gap layer adjacent to the second dichroic coating C2 are provided between the prism P2 and the prism P3.

The digital micromirror device DP (FIG. 3) includes first, second, and third digital micromirror devices DP1, DP2, and DP3 for blue, red, and green, respectively. The illumination light L1 is separated into respective colors of blue, red, and green by the color separating/synthesizing prism PD. In other words, the optical unit PU3 includes the first digital micromirror device DP1 on which the illumination light L1 reflected at the first dichroic coating C1 is incident, the second digital micromirror device DP2 on which the illumination light L1 reflected at the second dichroic coating C2 is incident, and the third digital micromirror device DP3 on which the illumination light L1 that has passed through the first and second dichroic coatings C1, C2 is incident.

In the illumination light L1 incident on the prism P1 of the color separating/synthesizing prism PD, the blue light is reflected at the first dichroic coating C1, and the red light and the green light pass through the first dichroic coating C1. The blue illumination light L1 that has been reflected at the first dichroic coating C1 is totally reflected, then is emitted from the color separating/synthesizing prism PD, and illuminates the digital micromirror device DP1 for blue. Between the red and green illumination light L1 having passed through the first dichroic coating C1, the red illumination light L1 is reflected at the second dichroic coating C2, and the green illumination light L1 passes through the second dichroic coating C2. The red illumination light L1 that has been reflected at the second dichroic coating C2 is totally reflected, then is emitted from the color separating/synthesizing prism PD, and illuminates the digital micromirror device DP2 for red. The green illumination light L1 that has passed through the second dichroic coating C2 is emitted from the color separating/synthesizing prism PD and illuminates the digital micromirror device DP3 for green.

The blue ON light L2 that has been reflected at the digital micromirror device DP1 for blue is incident on and totally reflected at the color separating/synthesizing prism PD, and is reflected at the first dichroic coating C1. The red ON light L2 that has been reflected at the digital micromirror device DP2 for red is incident on and totally reflected at the color separating/synthesizing prism PD, then is reflected at the second dichroic coating C2 and further, passes through the first dichroic coating C1. The green ON light L2 that has been reflected at the digital micromirror device DP3 for green is incident on the color separating/synthesizing prism PD, and passes through the second dichroic coating C2 and the first dichroic coating C1.

Among the light emitted from the three digital micromirror devices DP1 to DP3 that have been illuminated by the illumination light L1, as described above, the ON light L2 to be used for image projection is color-synthesized at the first and second dichroic coatings C1, C2. In the optical unit PU3 (FIG. 9), the blue, red, and green ON light L2 are synthesized on the same optical axis AX (FIG. 2), emitted from the color separating/synthesizing prism PD, and projected onto the screen SC by the projection optical system LN. Meanwhile, the OFF light L3 is emitted to the image projection side in a direction different from the ON light L2, and absorbed by a light shielding plate (not illustrated).

As illustrated in FIG. 9, the optical path of the OFF light L3 from the digital micromirror device DP3 is secured in the color separating/synthesizing prism PD through relative rotation of a first plane H1 and a second plane H2 from a state where the first plane H1 and the second plane H2 are orthogonal to each other. The first plane H1 is a plane including the optical axis AX1 of the illumination light L1 and the optical axis AX2 of the ON light L2 on the image display surface DS of the third digital micromirror device DP3. The second plane H2 is a plane including surface normals N1, N2 of the first and second dichroic coatings C1, C2. By securing the optical path of the OFF light L3 in the color separating/synthesizing prism PD as described above, a spreading angle of the ray in the X direction can be made small. FIG. 10A illustrates the spreading angle of the ray in the X direction before rotation, and FIG. 10B illustrates the spreading angle of the ray in the X direction after rotation.

In the first to third digital micromirror devices DP1 to DP3 mounted on the optical unit PU3, similar to the optical units PU1, PU2, the unnecessary light called the OFF light L3 which is not used in a projected image is generated. The OFF light L3 causes a contrast reduction of the projected image or a temperature rise of the optical unit PU3 including a mechanical component and the like. In order to solve such problem, in the optical unit PU3, the optical path configured to emit the OFF light L3 to the image projection side in a direction different from the ON light L2 is secured in the color separating/synthesizing prism PD included in the prism optical system. In addition, as illustrated in FIG. 10, an increase in the size of the color separating/synthesizing prism PD necessary for securing the optical path of the OFF light L3 is kept to a minimum in the optical unit PU3. Therefore, even in the prism optical system using a Philips prism, by discharging the OFF light L3 from the side of the projection optical system LN while suppressing the back focal length of the projection optical system LN, the optical path makes it possible to effectively perform optical-path separation between the projected light (ON light) L2 suitable for the digital micromirror devices DP1 to DP3 that drive the micromirrors with respect to two axes orthogonal to each other, and the unnecessary light (OFF light) L3.

REFERENCE SIGNS LIST

PJ projector
LN projection optical system
PU1 to PU3 optical unit
PT light shielding plate
DP digital micromirror device
DP1 to DP3 first to third digital micromirror devices
DS image display surface
MR micromirror
MS pixel reflecting surface
PA TIR prism
PA1 to PA3 TIR prism
PB color synthesizing cross prism
PC color separating cross prism
PD color separating/synthesizing prism
P1 to P3 prism
AG air gap layer
RS reflecting surface
L1 illumination light
L2 ON light (projected light)
L3 OFF light (unnecessary light)
AX1 optical axis of illumination light
AX2 optical axis of projected light (ON light)
AX3 optical axis of OFF light
MS1 reference plane
MS2 ON reflecting surface
MS3 OFF reflecting surface
1 light source
2 illumination optical system
2a reflecting mirror
2b relay lens
3 control unit
4 actuator
AX optical axis
SC screen
C1, C2 first and second dichroic coatings
H1, H2 first and second planes

The invention claimed is:
1. An image projection optical unit comprising:
a digital micromirror device configured to form an image by modulating an intensity of illumination light while subjecting an inclination of each micromirror surface to ON/OFF control in an image display surface including a plurality of micromirrors and, at the time of forming the image, drive the micromirrors subjected to the ON/OFF control with respect to two axes; and
a prism optical system configured to emit, to an image projection side, ON light reflected at the micromirror in an ON state among emitted light the intensity of which has been modulated by the digital micromirror device,
wherein an optical path is secured in the prism optical system, the optical path being configured to emit, to the image projection side in a different direction from the ON light, OFF light reflected at the micromirror in an OFF state among the emitted light the intensity of which has been modulated by the digital micromirror device,
wherein the prism optical system includes a TIR prism and a color synthesizing cross prism, and the TIR prism is disposed between the digital micromirror device and the color synthesizing cross prism, and
wherein a side surface of the TIR prism on which the OFF light is incident is a reflecting surface.

2. The optical unit according to claim 1, wherein the reflecting surface has a total reflection characteristic with respect to the OFF light.

3. The optical unit according to claim 2, wherein a height of the color synthesizing cross prism is set such that the OFF light reflected at an upper surface of the color synthesizing cross prism is separated from the ON light on an emission surface of the color synthesizing cross prism.

4. The optical unit according to claim 2, wherein the following conditional expression (1) is satisfied:

$$H \geq (h1+h2)/2 - h3 + m \quad (1)$$

where $h1 = Y1 + X1 \cdot \tan\alpha 1 + X2 \cdot \tan\alpha 2 + X3 \cdot \tan\alpha 3 + X4 \cdot \tan\alpha 4$ $h2 = Y1 + X1 \cdot \tan\beta 1 + X2 \cdot \tan\beta 2 + X3 \cdot \tan\beta 3 + X4 \cdot \tan\beta 4$ $h3 = Y1 + X1 \cdot \tan\gamma 1 + X2 \cdot \tan\gamma 2 + X3 \cdot \tan\gamma 3 + X4 \cdot \tan\gamma 4$ $\alpha 2 = \sin^{-1}\{(n1/n2) \cdot \sin\alpha 1\}$ $\alpha 3 = \sin^{-1}\{(n2/n3) \cdot \sin\alpha 2\}$ $\alpha 4 = \sin^{-1}\{(n3/n4) \cdot \sin\alpha 3\}$ $\beta 2 = \sin^{-1}\{(n1/n2) \cdot \sin\beta 1\}$ $\beta 3 = \sin^{-1}\{(n2/n3) \cdot \sin\beta 2\}$ $\beta 4 = \sin^{-1}\{(n3/n4) \cdot \sin\beta 3\}$ $\gamma 2 = \sin^{-1}\{(n1/n2) \cdot \sin\gamma 1\}$ $\gamma 3 = \sin^{-1}\{(n2/n3) \cdot \sin\gamma 2\}$ $\gamma 4 = \sin^{-1}\{(n3/n4) \cdot \sin\gamma 3\}$, and the digital micromirror device includes a cover slip on the image display surface and, when the color synthesizing cross prism is viewed from the side,
Y1: a distance from the center of the image display surface to a pixel that is farthest away upward from the center,
$\alpha 1$: an angle formed between a ray of the ON light away upward from the center of the image display surface by the distance Y1, and an optical axis of projected light,
$\beta 1$: an angle formed between a ray of the OFF light away upward from the center of the image display surface by the distance Y1, and the optical axis of the projected light,
$\gamma 1$: an angle formed between a ray of the ON light away downward from the center of the image display surface by the distance Y1, and the optical axis of the projected light (in the reverse direction from $\alpha 1$ and $\beta 1$ and represented in a negative value),
X1: a distance from the image display surface to the cover slip,
n1: a refractive index between the image display surface and the cover slip,
X2: a thickness of the cover slip,
n2: a refractive index of the cover slip,
X3: a distance from the cover slip to the TIR prism,
n3: a refractive index between the cover slip and the TIR prism,
X4: a thickness from the TIR prism to the color synthesizing cross prism,
n4: a refractive index between the TIR prism and the color synthesizing cross prism,
m: a margin at the time of manufacture, and
H: a height of the color synthesizing cross prism.

5. The optical unit according to claim 2, comprising an air gap layer between the TIR prism and the color synthesizing cross prism.

6. A three-plate projector comprising:
a light source;
an illumination optical system configured to collect light from the light source and emit illumination light;
the optical unit according to claim 2; and
a projection optical system configured to project an image, displayed on the digital micromirror device, onto a screen in an enlarged manner.

7. The optical unit according to claim 1, wherein a height of the color synthesizing cross prism is set such that the OFF light reflected at an upper surface of the color synthesizing cross prism is separated from the ON light on an emission surface of the color synthesizing cross prism.

8. The optical unit according to claim 7, wherein the following conditional expression (1) is satisfied:

$$H \geq (h1+h2)/2 - h3 + m \tag{1}$$

where $h1 = Y1 + X1 \cdot \tan \alpha 1 + X2 \cdot \tan \alpha 2 + X3 \cdot \tan \alpha 3 + X4 \cdot \tan \alpha 4$ $h2 = Y1 + X1 \cdot \tan \beta 1 + X2 \cdot \tan \beta 2 + X3 \cdot \tan \beta 3 + X4 \cdot \tan \beta 4$ $h3 = Y1 + X1 \cdot \tan \gamma 1 + X2 \cdot \tan \gamma 2 + X3 \cdot \tan \gamma 3 + X4 \cdot \tan \gamma 4$ $\alpha 2 = \sin^{-1}\{(n1/n2) \cdot \sin \alpha 1\}$ $\alpha 3 = \sin^{-1}\{(n2/n3) \cdot \sin \alpha 2\}$ $\alpha 4 = \sin^{-1}\{(n3/n4) \cdot \sin \alpha 3\}$ $\beta 2 = \sin^{-1}\{(n1/n2) \cdot \sin \beta 1\}$ $\beta 3 = \sin^{-1}\{(n2/n3) \cdot \sin \beta 2\}$ $\beta 4 = \sin^{-1}\{(n3/n4) \cdot \sin \beta 3\}$ $\gamma 2 = \sin^{-1}\{(n1/n2) \cdot \sin \gamma 1\}$ $\gamma 3 - \sin^{-1}\{(n2/n3) \cdot \sin \gamma 2\}$ $\gamma 4 = \sin^{-1}\{(n3/n4) \cdot \sin \gamma 3\}$, and the digital micromirror device includes a cover slip on the image display surface and, when the color synthesizing cross prism is viewed from the side,
Y1: a distance from the center of the image display surface to a pixel that is farthest away upward from the center,
$\alpha 1$: an angle formed between a ray of the ON light away upward from the center of the image display surface by the distance Y1, and an optical axis of projected light,
$\beta 1$: an angle formed between a ray of the OFF light away upward from the center of the image display surface by the distance Y1, and the optical axis of the projected light,
$\gamma 1$: an angle formed between a ray of the ON light away downward from the center of the image display surface by the distance Y1, and the optical axis of the projected light (in the reverse direction from $\alpha 1$ and $\beta 1$ and represented in a negative value),
X1: a distance from the image display surface to the cover slip,
n1: a refractive index between the image display surface and the cover slip,
X2: a thickness of the cover slip,
n2: a refractive index of the cover slip,
X3: a distance from the cover slip to the TIR prism,
n3: a refractive index between the cover slip and the TIR prism,
X4: a thickness from the TIR prism to the color synthesizing cross prism,
n4: a refractive index between the TIR prism and the color synthesizing cross prism,
m: a margin at the time of manufacture, and
H: a height of the color synthesizing cross prism.

9. The optical unit according to claim 7, comprising an air gap layer between the TIR prism and the color synthesizing cross prism.

10. The optical unit according to claim 1, wherein the following conditional expression (1) is satisfied:

$$H \geq (h1+h2)/2 - h3 + m \tag{1}$$

where $h1 = Y1 + X1 \cdot \tan \alpha 1 + X2 \cdot \tan \alpha 2 + X3 \cdot \tan \alpha 3 + X4 \cdot \tan \alpha 4$ $h2 = Y1 + X1 \cdot \tan \beta 1 + X2 \cdot \tan \beta 2 + X3 \cdot \tan \beta 3 + X4 \cdot \tan \beta 4$ $h3 = Y1 + X1 \cdot \tan \gamma 1 + X2 \cdot \tan \gamma 2 + X3 \cdot \tan \gamma 3 + X4 \cdot \tan \gamma 4$ $\alpha 2 = \sin^{-1}\{(n1/n2) \cdot \sin \alpha 1\}$ $\alpha 3 = \sin^{-1}\{(n2/n3) \cdot \sin \alpha 2\}$ $\alpha 4 = \sin^{-1}\{(n3/n4) \cdot \sin \alpha 3\}$ $\beta 2 = \sin^{-1}\{(n1/n2) \cdot \sin \beta 1\}$ $\beta 3 = \sin^{-1}\{(n2/n3) \cdot \sin \beta 2\}$ $\beta 4 = \sin^{-1}\{(n3/n4) \cdot \sin \beta 3\}$ $\gamma 2 = \sin^{-1}\{(n1/n2) \cdot \sin \gamma 1\}$ $\gamma 3 - \sin^{-1}\{(n2/n3) \cdot \sin \gamma 2\}$ $\gamma 4 = \sin^{-1}\{(n3/n4) \cdot \sin \gamma 3\}$, and the digital micromirror device includes a cover slip on the image display surface and, when the color synthesizing cross prism is viewed from the side,
Y1: a distance from the center of the image display surface to a pixel that is farthest away upward from the center,
$\alpha 1$: an angle formed between a ray of the ON light away upward from the center of the image display surface by the distance Y1, and an optical axis of projected light,
$\beta 1$: an angle formed between a ray of the OFF light away upward from the center of the image display surface by the distance Y1, and the optical axis of the projected light,
$\gamma 1$: an angle formed between a ray of the ON light away downward from the center of the image display surface by the distance Y1, and the optical axis of the projected light (in the reverse direction from $\alpha 1$ and $\beta 1$ and represented in a negative value),
X1: a distance from the image display surface to the cover slip,
n1: a refractive index between the image display surface and the cover slip,
X2: a thickness of the cover slip,
n2: a refractive index of the cover slip,
X3: a distance from the cover slip to the TIR prism,
n3: a refractive index between the cover slip and the TIR prism,
X4: a thickness from the TIR prism to the color synthesizing cross prism, n4: a refractive index between the TIR prism and the color synthesizing cross prism, m: a margin at the time of manufacture, and H: a height of the color synthesizing cross prism.

11. The optical unit according to claim 1, comprising an air gap layer between the TIR prism and the color synthesizing cross prism.

12. An image projection optical unit comprising:

a digital micromirror device configured to form an image by modulating an intensity of illumination light while subjecting an inclination of each micromirror surface to ON/OFF control in an image display surface including a plurality of micromirrors and, at the time of forming the image, drive the micromirrors subjected to the ON/OFF control with respect to two axes; and a prism optical system configured to emit, to an image projection side, ON light reflected at the micromirror in an ON state among emitted light the intensity of which has been modulated by the digital micromirror device, wherein an optical path is secured in the prism optical system, the optical path being configured to emit, to the image projection side in a different direction from the ON light, OFF light reflected at the micromirror in an OFF state among the emitted light the intensity of which has been modulated by the digital micromirror device, and wherein the prism optical system is a color separating/synthesizing prism having dichroic coating, the illumination light having passed through the dichroic coating is incident on the digital micromirror device, and when a first plane is defined as a plane including the optical axis of the illumination light and the optical axis of the projected light on the image display surface of the digital micromirror device and a second plane is defined as a plane including surface normals of the dichroic coating, the optical path of the OFF light from the digital micromirror device is secured in the color separating/synthesizing prism through relative rotation of the first plane and the second plane from a state where the first plane and the second plane are orthogonal to each other.

13. A three-plate projector comprising:

a light source;

an illumination optical system configured to collect light from the light source and emit illumination light;

the optical unit according to claim 12; and a projection optical system configured to project an image, displayed on the digital micromirror device, onto a screen in an enlarged manner.

14. The optical unit according to claim 12, wherein the OFF light proceeds in a direction different from a plane including the illumination light and the ON light.

15. A three-plate projector comprising:

a light source;

an illumination optical system configured to collect light from the light source and emit illumination light;

the optical unit according to claim 1; and a projection optical system configured to project an image, displayed on the digital micromirror device, onto a screen in an enlarged manner.

16. A three-plate projector comprising:

a light source;

an illumination optical system configured to collect light from the light source and emit illumination light;

the optical unit according to claim 1; and a projection optical system configured to project an image, displayed on the digital micromirror device, onto a screen in an enlarged manner.

17. The optical unit according to claim 1, wherein a height of the color synthesizing cross prism is set such that the OFF light reflected at an upper surface of the color synthesizing cross prism is separated from the ON light on an emission surface of the color synthesizing cross prism.

18. The optical unit according to claim 1, wherein the following conditional expression (1) is satisfied:

$$H \geq (h1+h2)/2 - h3 + m \quad (1)$$

where $h1 = Y1 + X1 \cdot \tan\alpha 1 + X2 \cdot \tan\alpha 2 + X3 \cdot \tan\alpha 3 + X4 \cdot \tan\alpha 4$ $h2 = Y1 + X1 \cdot \tan\beta 1 + X2 \cdot \tan\beta 2 + X3 \cdot \tan\beta 3 + X4 \cdot \tan\beta 4$ $h3 = Y1 + X1 \cdot \tan\gamma 1 + X2 \cdot \tan\gamma 2 + X3 \cdot \tan\gamma 3 + X4 \cdot \tan\gamma 4$ $\alpha 2 = \sin^{-1}\{(n1/n2) \cdot \sin\alpha 1\}$ $\alpha 3 = \sin^{-1}\{(n2/n3) \cdot \sin\alpha 2\}$ $\alpha 4 = \sin^{-1}\{(n3/n4) \cdot \sin\alpha 3\}$ $\beta 2 = \sin^{-1}\{(n1/n2) \cdot \sin\beta 1\}$ $\beta 3 = \sin^{-1}\{(n2/n3) \cdot \sin\beta 2\}$ $\beta 4 = \sin^{-1}\{(n3/n4) \cdot \sin\beta 3\}$ $\gamma 2 = \sin^{-1}\{(n1/n2) \cdot \sin\gamma 1\}$ $\gamma 3 = \sin^{-1}\{(n2/n3) \cdot \sin\gamma 2\}$ $\gamma 4 = \sin^{-1}\{(n3/n4) \cdot \sin\gamma 3\}$, and the digital micromirror device includes a cover slip on the image display surface and, when the color synthesizing cross prism is viewed from the side, Y1: a distance from the center of the image display surface to a pixel that is farthest away upward from the center, α1: an angle formed between a ray of the ON light away upward from the center of the image display surface by the distance Y1, and an optical axis of projected light, β1: an angle formed between a ray of the OFF light away upward from the center of the image display surface by the distance Y1, and the optical axis of the projected light, γ1: an angle formed between a ray of the ON light away downward from the center of the image display surface by the distance Y1, and the optical axis of the projected light (in the reverse direction from α1 and β1 and represented in a negative value), X1: a distance from the image display surface to the cover slip, n1: a refractive index between the image display surface and the cover slip, X2: a thickness of the cover slip, n2: a refractive index of the cover slip, X3: a distance from the cover slip to the TIR prism, n3: a refractive index between the cover slip and the TIR prism, X4: a thickness from the TIR prism to the color synthesizing cross prism, n4: a refractive index between the TIR prism and the color synthesizing cross prism, m: a margin at the time of manufacture, and H: a height of the color synthesizing cross prism.

19. The optical unit according to claim 1, comprising an air gap layer between the TIR prism and the color synthesizing cross prism.

20. A three-plate projector comprising:
- a light source;
- an illumination optical system configured to collect light from the light source and emit illumination light;
- the optical unit according to claim 1; and
- a projection optical system configured to project an image, displayed on the digital micromirror device, onto a screen in an enlarged manner.

21. The optical unit according to claim 1, wherein the OFF light proceeds in a direction different from a plane including the illumination light and the ON light.

* * * * *